Jan. 1, 1952  A. E. DRISSNER ET AL  2,581,082
LEAD SCREW THREADING ATTACHMENT
Filed March 8, 1946  5 Sheets-Sheet 1
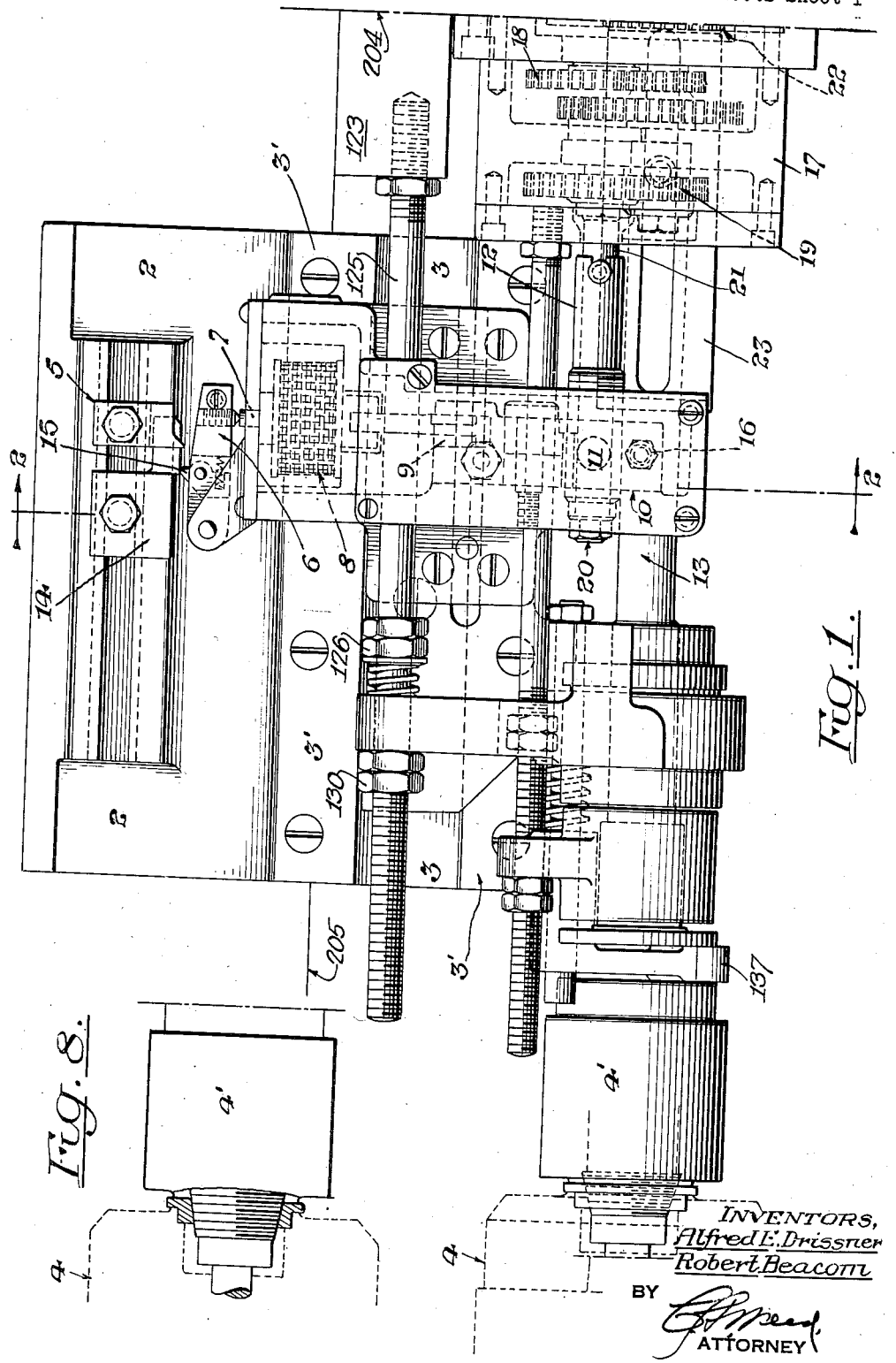
INVENTORS,
Alfred E. Drissner
Robert Beacom
BY
ATTORNEY

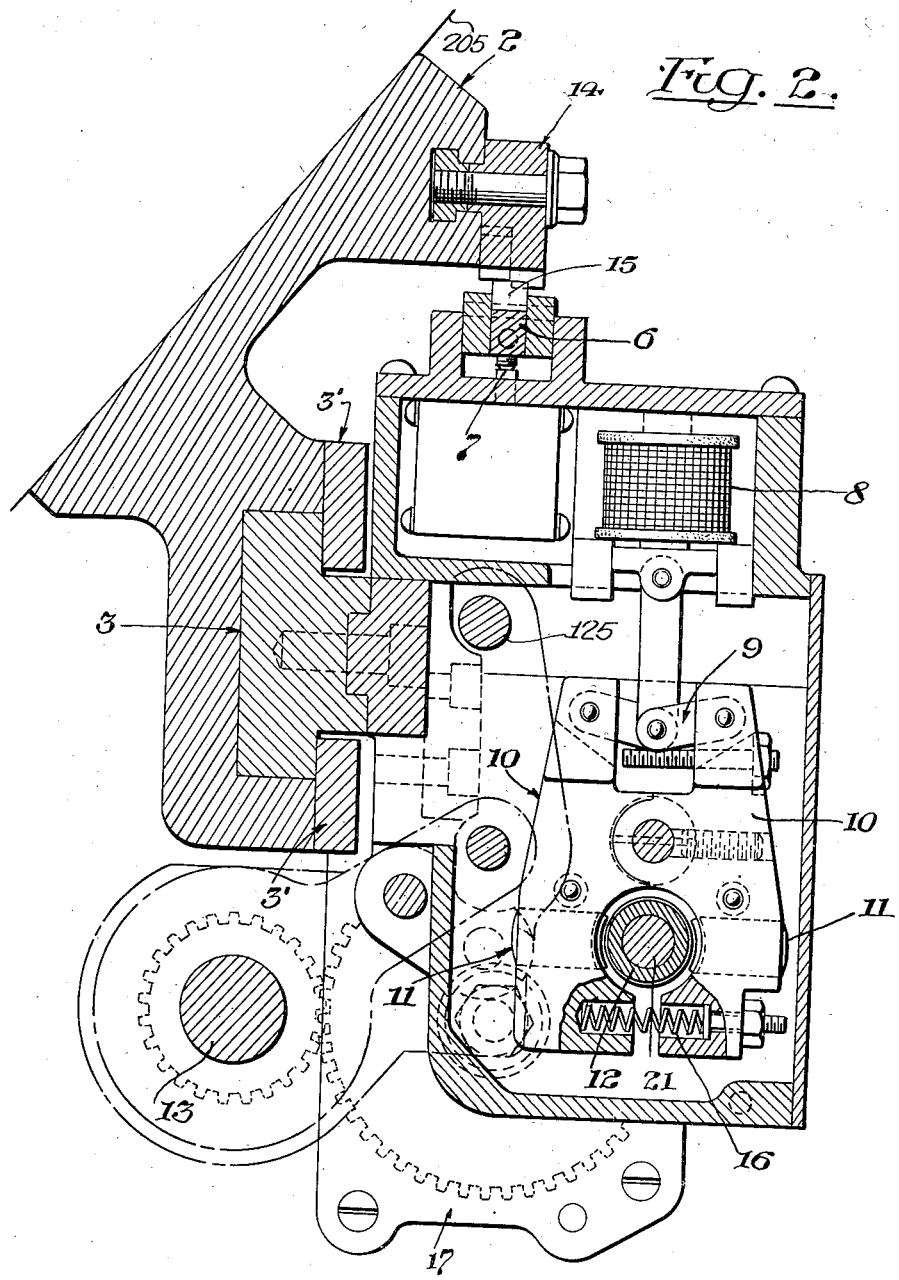

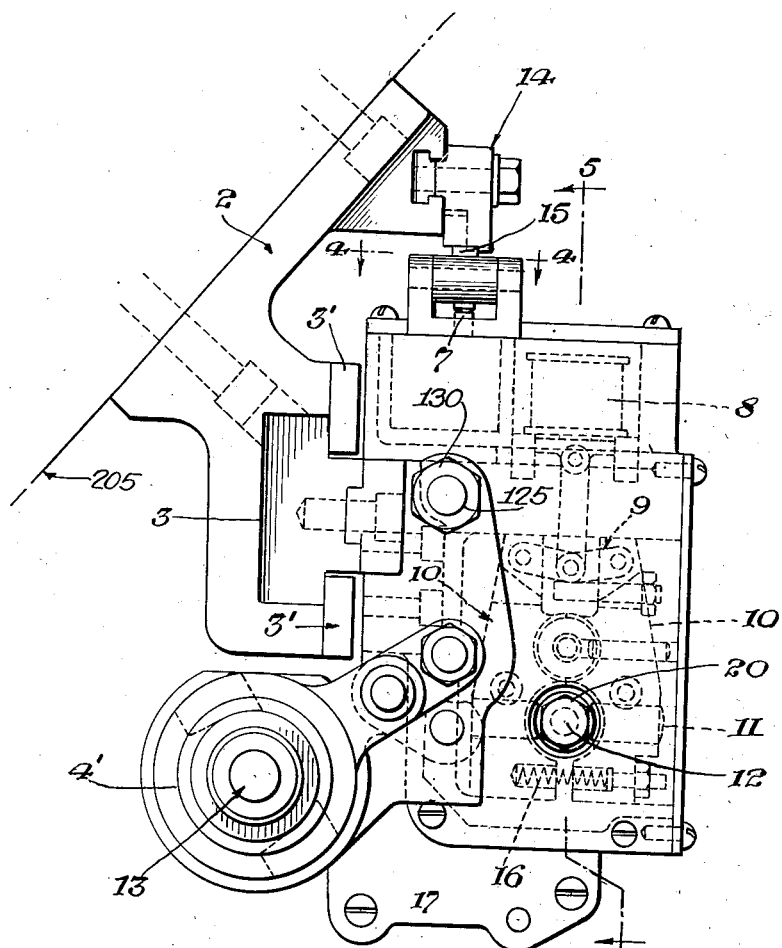
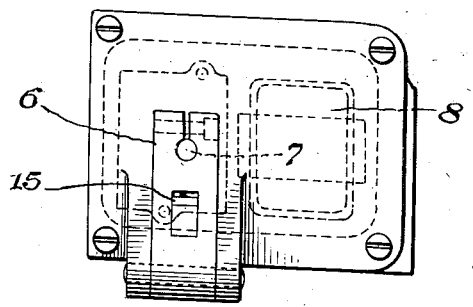

Jan. 1, 1952
A. E. DRISSNER ET AL
2,581,082
LEAD SCREW THREADING ATTACHMENT
Filed March 8, 1946
5 Sheets-Sheet 4
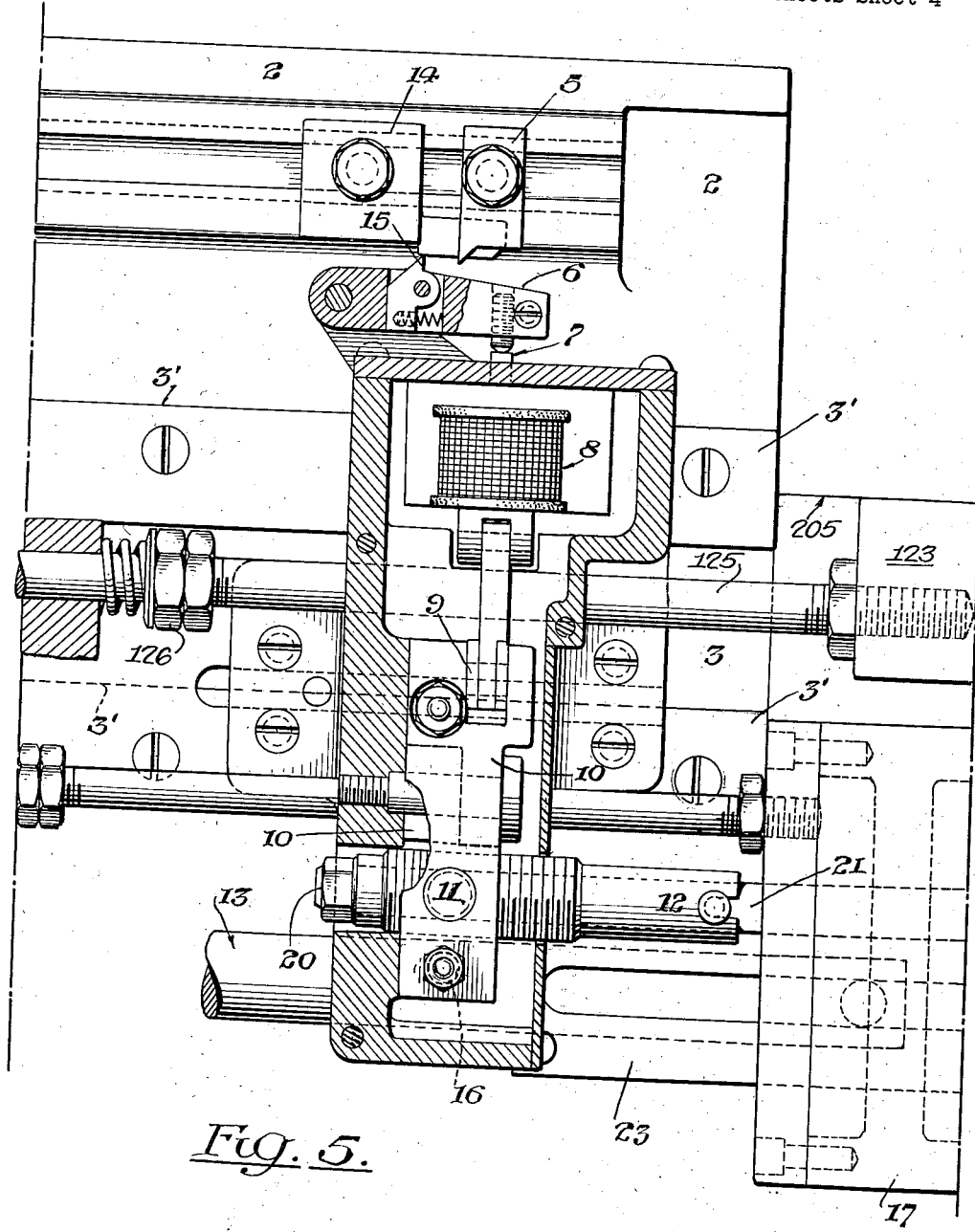
Fig. 5.
INVENTORS,
Alfred E. Drissner
Robert Beacom
BY 
ATTORNEY INVENTORS,
Alfred E. Drissner
Robert Beacom Patented Jan. 1, 1952

2,581,082

UNITED STATES PATENT OFFICE 2,581,082

LEAD SCREW THREADING ATTACHMENT

Alfred E. Drissner and Robert Beacom, Cleveland, Ohio, assignors to The National Acme Company, Cleveland, Ohio, a corporation of Ohio Application March 8, 1946, Serial No. 652,841

7 Claims. (Cl. 10—105)

This invention relates to threading mechanisms for metal working machines such as multiple spindle bar or chucking machines, the object of the invention being to provide an auxiliary threading attachment simple in construction and readily attachable to a multiple spindle machine for interchangeable use with or independently of the usual threading attachment of such a machine, and in which the threading die or tap spindle is forwardly shifted at a predetermined time by a lead screw to control the lead of the tap or die instead of by cams and levers as is the ordinary threading attachment of a multiple spindle machine.

Heretofore, when it has been attempted to control the forward movement of the threading mechanism by means of a lead screw, it has been necessary to provide a very complicated expensive unit of the machine itself and the machine had to be specially designed and built to provide the necessary driving and operating means therefor, whereas, in the present improvement, this improved lead screw mechanism can be made up as a separate attachment of simple construction, easily adjustable and readily attached to the machine to cooperate with the usual type of cam operated threading attachment for any size or make of automatic multiple spindle machine.

In the drawings accompanying and forming a part of this specification, Fig. 1 is a side view of this improved auxiliary threading attachment applied to a multiple spindle machine.

Fig. 2 is an enlarged vertical sectional view taken on line 2—2 of Fig. 1.

Fig. 3 is an end view of Fig. 2.

Fig. 4 is a plan view taken on line 4—4 of Fig. 3 and illustrates the tripping mechanism.

Fig. 5 is a longitudinal vertical sectional view taken on line 5—5 of Fig. 3.

Fig. 8 is a detail sectional view of the work spindle carrier and the threading tool of the threading mechanism as shown at the left hand end in Fig. 1.

Similar reference characters indicate corresponding parts in the several views.

Figure 6:
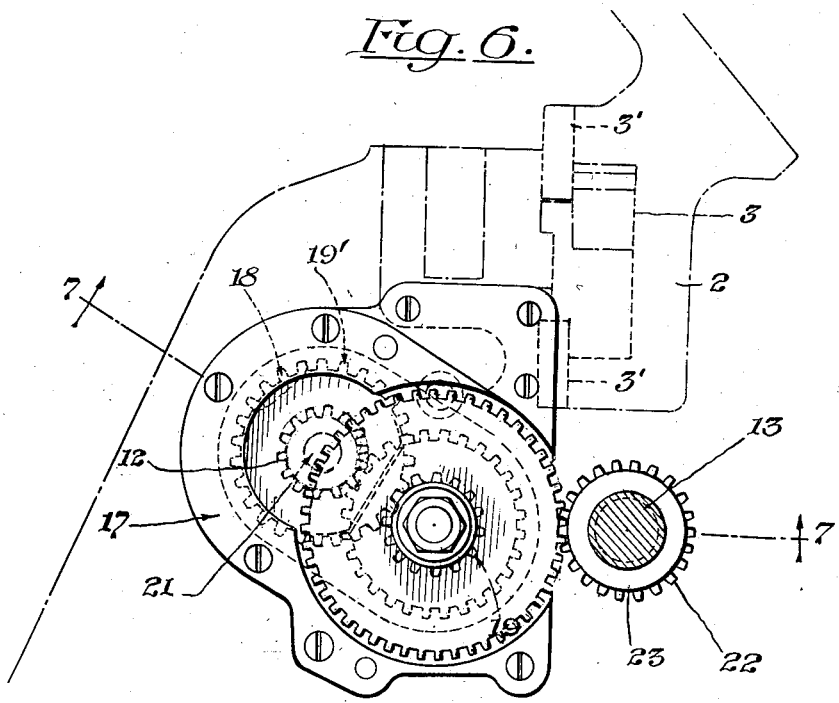
Fig. 6 is an end view of the gear box unit shown at the right of Fig. 1.
Figure 7:
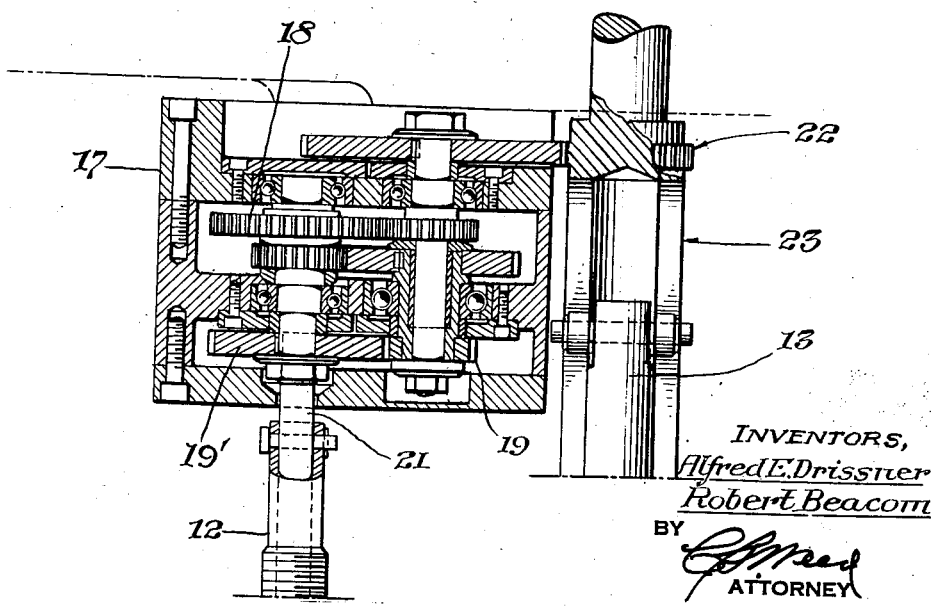
Fig. 7 is a sectional view taken on the line 7—7 of Fig. 6.

Before explaining in detail the present improvement and its mode of operation, we desire it understood that the present invention is not limited to the details of construction and arrangement of parts illustrated in the accompanying drawings since the invention is capable of other embodiments, and that the phraseology employed is for the purpose of description and not of limitation.

This improved auxiliary threading attachment is intended for use with multiple spindle automatic screw machines, one of which is illustrated in Letters Patent to C. W. Simpson and Alfred E. Drissner, No. 2,033,490 of March 10, 1936, owned by The National Acme Company, of Cleveland, Ohio, the assignees of the present improvement, and wherein Figs. 5, 19 and 24, particularly the latter, illustrate a threading means shifted toward and from the work by a cam drum and levers and to which the present threading attachment may be attached and operated in the same way and by substantially the same means but, in addition, may also be operated by means of a lead screw.

On an automatic multiple spindle bar or chucking machine, it is the usual practice to mount the die or tap on a rotating spindle carried by a slide, which spindle, for right hand threading, rotates in the same direction as the work holding spindle but at a slower speed, the speed of the threading attachment being changed by means of suitable clutches such as illustrated in said patent for releasing the die or tap from the work. When a left hand thread is to be cut, the action would be just the reverse, the threading spindle running faster than the work spindle and reduced in speed by the shifting of the clutch to remove the tap from the work. The die slide carrying the die or tap spindle is moved toward the work by means of suitable cams and levers, etc., as shown in said patent.

By the provision of this improved auxiliary threading attachment, the die slide may also be shifted toward the work by means of a lead screw to permit the cutting of short threads or extremely accurate threads and, therefore, this auxiliary attachment is mounted to cooperate with the regular die slide so that the customer can operate the die or threading attachment either with cams and levers in the conventional way or by means of the lead screw for certain classes of work. Thus, the die slide with the threading spindle may be moved forward toward the work with a quick motion controlled by the cams and levers to eliminate the slow forward motion necessary when a lead screw controls the movement.

Therefore, the object of the present improvement is not only to provide an auxiliary lead screw operated threading attachment for ready attachment to such machines as hereinbefore referred to but also to provide a simple automatically operative means for throwing that lead screw mechanism into and out of operation.

For supporting this improved auxiliary threading attachment, a suitable supporting bracket 2 is provided, which bracket may be attached to the triangular bracket 205 (see Figures 24 and 27 of the patent hereinbefore referred to). The threading attachment is supported by this bracket 2 for sliding movement as, for instance, by means of a slide-way 3 and gibs 3' (see Fig. 2) and since this sliding or reciprocating movement may be controlled by the cams, levers and connections shown in said patent, it is not necessary to repeat the description thereof herein.

When the tap or die 4' contacts the work carried by the work spindle 4 (see Fig. 1), the die slide 3 to which the lead screw attachment is fastened contacts, by means of a pivoted trip lever 6, a cam or finger 5 located on the die slide bracket 2. This trip lever 6 controls a suitable switch such as a snap action switch. The cam 5 is adjustable along the bracket 2 for different lengths of threads. Consequently, when the trip lever 6 contacts the cam 5 and is pressed downward, this downward motion of the trip lever 6 engages a pin 7 of the snap action switch which controls a solenoid 8. The upward movement of this solenoid actuates a toggle 9 which is connected to and operates a scissors-type double lever 10 carrying at the lower ends thereof opposed lead screw nuts 11 so that these nuts are brought into contact with the lead screw 12. The die or tap spindle 13 carrying the threading die or tap is thereafter shifted forwardly by the thread cut on the lead screw 12 until the desired length of thread or depth of the tapped hole is accomplished. The rotary movement of the lead screw is obtained by the gear unit hereinafter described. During this forward movement of the die or tap, the trip lever 6 is controlled by an adjustable cam 14 carried by the bracket 2 contacting a latch 15 carried by the trip lever 6 which slides along the straight surface of the cam 14, adjustable endwise to control the length of thread, until the latch 15 drops off the cam 14, thus releasing pressure on the snap action switch and permitting the trip lever 6 to move upwardly which, in turn, allows the solenoid to return to its original position, thereby shifting the scissors-type levers 10 away from each other and, therefore, the lead screw nuts 11 away from the lead screw 12, this being assisted by a spring 16 acting to spread the scissors-type levers.

Thus, by this means, the lead screw is free of control and, therefore, the movement of the tap or die spindle is likewise no longer controlled by the lead screw and can be shifted backward by the usual cams and levers. As soon as the die spindle speed has been changed for the return motion of the die or tap, it is unscrewed from the work and the whole die slide can be returned rapidly by means of the controlling means such as the cams and levers hereinbefore referred to.

When the die spindle is used with a self-opening die or collapsible tap, it can remain constant at the required cutting speed which is generally one-third, one-fifth or one-seventh of the work spindle speed. The speed of the die spindle does not have to be changed in connection with such threading tools because, when relieving a collapsible tap or die, the die or tap and its driving shafts will disengage automatically from the work so that there is no delay for the quick return of the die slide operated by the cams and levers.

To accomplish the different speeds between the threading spindle and the work holding spindle which is obtained by suitable gears and clutches, a gear reduction has to be provided to control the R. P. M. of the lead screw so that the lead screw will move the die slide forward with precision exactly the same distance as the lead provided for by the tap or die chaser and for this purpose, a gear unit is provided mounted in a gear box 17 and provided with reduction gears 18. Suitable change gears 19' are also provided in this gear box to compensate for the large number of different pitch threads. For example, the chuck of the work spindle 4 holds a piece of work (see Figs. 1 and 8) to be threaded by a collapsible tap and because of the taper thereof it is a very difficult thread to cut for this particular part would have to have a 40 pitch thread per inch, which is a very fine tapered thread, and since a 40 pitch thread would not be suitable for the lead screw to be engaged and disengaged by the nuts 11, the lead screw is provided with a 10 pitch thread to compensate for the different speeds. To correct differences between the pitch of the lead screw and the pitch of the work, suitable change gears reduce the speed of the lead screw to the required value, such as four to one so that one revolution of the lead screw is equal to four threads on the work which is to be tapped. Thus, by this simple gear box or reduction unit, which may be constructed of reduction gears or planetary gears or worm drive so long as it is used as a speed reduction unit, we can obtain the right speed for the lead screw.

In those cases where special threads are to be cut, the lead screw itself can be changed quickly by removing the nut and washer 20 which permits the removal of the lead screw 12 from its drive shaft 21 to which it is coupled.

This gear reduction unit is operated by a gear 22 mounted on the slotted die spindle driving sleeve 23 which rotates the die spindle 13, and this gear also rotates through the gear unit, the lead screw shaft 21 and, therefore, the lead screw 12, it being driven from any suitable source of power. In this case, compared with the structure shown in Patent No. 2,033,490, the die slide 3 replaces the die slide 131 of the patent, and the die spindle 13 may be the same as the die spindle 151 of the patent. Further the gear box 17 may be directly attached to the support 204 of the patent. The driving gear 22 is carried by the die spindle sleeve 23, and this sleeve may be the same as the sleeve 148 of the patent with the added gear 22 thereon. The die slide 3 may be operated in the ordinary manner by the cam drum provided in the automatic spindle machine of the patent. Such a cam drive reciprocates the bracket 123, which in turn drives the threaded rod 125. The rod 125 is connected to the die slide 3 by the nuts 126 and 130. The die slide 3 reciprocates the die 4' through the die yoke 137. The reference numbers 123, 125, 126, 130, 137, 204 and 205 are the same as those in the aforementioned patent, and illustrate that the die slide 3 may be driven from the usual cam drum, and that additionally this die slide may selectively be driven from the lead screw 12 at the will of the operator. The gear 22 has been shown as integral with the die spindle sleeve 23, however, it will be obvious that this gear could be made separate from the sleeve and then made fast to the sleeve, as by a key.

Thus, by using all of the standard parts of the die spindle shown, for instance, in said patent and adding only the driving gear 22 to the die spindle drive sleeve 23 without any change in the gear box or any other mechanical means, this attachment can be readily applied so that the tap or die can be operated by the lead screw at the proper time and by means of this simple auxiliary attachment, which can be used on any automatic bar or chucking machine, the threading can be done by means of a cam and lever mechanism or by the lead screw, whichever is the more desirable, with the least cost of changing the machine and without the necessity of building a special machine with the necessary major changes therein to provide this tool operated mechanism so that the customer can purchase a standard machine and apply this auxiliary attachment thereto at any time he may desire.

It is to be understood that by describing in detail herein any particular form, structure or arrangement, it is not intended to limit the invention beyond the terms of the several claims or the requirements of the prior art.

Having thus explained the nature of our said invention and described a way of constructing and using the same, although without attempting to set forth all of the forms in which it may be made or all of the modes of its use, we claim:

1. In an automatic multiple spindle machine, the combination of an auxiliary threading attachment having a slide and adapted to be attached to said machine and having a rotary die or tap spindle shifted by suitable mechanism and also having a lead screw for shifting the die or tap spindle, and means for automatically throwing said lead screw into and out of operation and embodying a solenoid operated mechanism, tripping means and cam means controlling the operation of said solenoid, one of said tripping means and cam means carried by the slide.

2. In an automatic multiple spindle machine, the combination of an auxiliary threading attachment having a slide and adapted to be attached to said machine and having a rotary die or tap spindle shifted by suitable mechanism and also having a lead screw for shifting the die or tap spindle, and means automatically throwing said lead screw into and out of operation and embodying a solenoid operated mechanism including a reduction and change speed gear unit, lead screw engaging means, scissor levers carrying said engaging means and connected with said solenoid for operation thereby, and tripping means controlling the operation of said solenoid and comprising a tripping lever and cam means for operating it, one carried by said slide.

3. In an automatic multiple spindle machine, the combination of an auxiliary threading attachment having a slide adapted to be attached to said machine and carrying a rotary die or tap spindle shiftable by suitable mechanism, a gear carrying sleeve for rotating said die spindle, a gear unit also operated by said gear, a lead screw rotated by said gear unit for shifting said slide, and means automatically throwing said lead screw into and out of operation and comprising a solenoid, scissor levers connected therewith, nuts carried by said scissor levers disposed to engage said lead screw, and tripping means controlling the actuation of said solenoid.

4. In an automatic multiple spindle machine, the combination of an auxiliary threading attachment having a slide adapted to be attached to said machine and carrying a rotary die or tap spindle shiftable by suitable mechanism, a gear carrying sleeve for rotating said die spindle, a reduction and change speed gear unit also operated by said gear, a lead screw rotated by said gear unit for shifting said slide, and means automatically throwing said lead screw into and out of operation and comprising a solenoid, scissor levers connected therewith, nuts carried by said scissor levers and disposed to engage said lead screw, and tripping means controlling the actuation of said solenoid.

5. In an automatic multiple spindle machine, the combination of an auxiliary threading attachment having a slide adapted to be attached to said machine and carrying a rotary die or tap spindle shiftable by suitable mechanism, a gear carrying sleeve for rotating said die spindle, a gear unit also operated by said gear, a lead screw rotated by said gear unit for shifting said slide, and means automatically throwing said lead screw into and out of operation and comprising a solenoid, toggle levers connected with said solenoid, scissor levers connected with said toggle levers, nuts carried by said scissor levers and disposed to engage said lead screw, tripping means controlling the actuation of said solenoid and comprising a tripping lever carried by said slide, first adjustable means disposed to engage said tripping lever to actuate it, and second adjustable means disposed to engage said tripping means to disconnect the nuts from the lead screw.

6. In a threading attachment for a machine having a rotary work spindle and a rotary tool spindle with a shiftable tool, the provision of a support slide engaging the shiftable tool and shiftable on the machine toward and away from the work spindle, a lead screw geared to the tool spindle, scissor levers mounted on said support slide, threaded means carried by the scissor levers and engageable with the lead screw, a solenoid interlinked with the scissor levers and energizable to operate the scissor levers and thereby engage the threaded means with the lead screw, and a limit control switch interrelated with the machine and the support slide to control the energization of the solenoid.

7. In a threading attachment for a machine having a rotary work spindle and a rotary tool spindle with a shiftable tool, the provision of a support slide engaging the shiftable tool and shiftable on the machine toward and away from the work spindle, a lead screw carried in parallel alignment with said work spindle and synchronously geared to said tool spindle, scissor levers mounted on said support slide, threaded means carried by the scissor levers and engageable with the lead screw, a solenoid interlinked with the scissor levers and energizable to operate the scissor levers and thereby engage the threaded means with the lead screw, and a limit control switch interrelated with the machine and the support slide to control the energization of the solenoid.

ALFRED E. DRISSNER.
ROBERT BEACOM.

REFERENCES CITED

The following references are of record in the file of this patent:

UNITED STATES PATENTS

| Number | Name | Date |
| --- | --- | --- |
| 1,796,538 | Rupple | Mar. 17, 1931 |
| 1,967,508 | Hibbard | July 24, 1934 |
| 2,069,098 | Rupple | Jan. 26, 1937 |
| 2,253,493 | Bakewell | Aug. 26, 1941 |
| 2,257,364 | Bakewell | Sept. 30, 1941 |
| 2,286,715 | Cheever | June 16, 1942 |
| 2,500,540 | Graves | Mar. 14, 1950 |